United States Patent [19]
Ochiai

[11] 3,744,855
[45] July 10, 1973

[54] SKID CONTROL DEVICE

[75] Inventor: Takeshi Ochiai, Toyota, Japan

[73] Assignee: Toyota Jidosha Kogyo Kabushiki Kaisha, Toyota-shi, Aichi-ken, Japan

[22] Filed: Nov. 4, 1971

[21] Appl. No.: 195,564

[30] Foreign Application Priority Data
Dec. 30, 1970 Japan.............................. 45/122433

[52] U.S. Cl. .......................... 303/21 BE, 188/181 C
[51] Int. Cl................................................ B60t 8/08
[58] Field of Search...................... 188/181; 303/20, 303/21; 317/5; 324/160–161; 340/263

[56] References Cited
UNITED STATES PATENTS

| 3,604,760 | 9/1971 | Atkins...................... 188/181 A X |
| 3,650,575 | 3/1972 | Okamoto ................... 188/181 C X |
| 3,663,070 | 5/1972 | Scharlack ....................... 303/20 X |
| 3,604,761 | 9/1971 | Okamoto et al. .............. 303/21 CG |
| 3,606,490 | 9/1971 | Ando .............................. 303/21 BE |
| 3,511,542 | 5/1970 | Fielek, Jr. ...................... 303/21 CG |
| 3,306,677 | 2/1967 | Dewar et al...................... 303/21 F |

Primary Examiner—Milton Buchler
Assistant Examiner—Stephen G. Kunin
Attorney—Richard & Stevens, Robert J. Frank et al.

[57] ABSTRACT

A skid control device comprising a wheel velocity detector for generating a wheel velocity voltage, a controller and a pressure modulator. The controller comprises a wheel velocity setting apparatus adapted to generate a pressure reducing signal and a pressure applying signal by detecting the deceleration of wheel velocity encountered during braking, the deceleration curve having a set gradient. The controller also comprises a first correcting apparatus adapted to correct the set gradient so as to decrease it in accordance with the increase in wheel velocity, and a second correcting apparatus adapted to correct the set gradient so as to increase it. The pressure modulator comprises a pressure modulating apparatus adapted to change the pressure of braking fluid of the wheel cylinder, and a change-over valve and a throttle valve which are adapted to actuate the pressure modulating apparatus so that the pressure of braking fluid is decreased upon receiving the pressure reducing signal and the thusly decreased pressure of braking fluid is increased again at a different speed upon receiving the pressure applying signal.

6 Claims, 6 Drawing Figures

SKID CONTROL DEVICE

BACKGROUND OF THE INVENTION

This invention relates to a skid control device for vehicles such as automobiles in which the pressure of the braking fluid in the wheel cylinder is regulated during emergency braking in accordance with the condition of the road surface. Operation of the device is independent of the efforts applied to the brake pedal thus preventing loss of controllability of the vehicle or spinning of the vehicle body due to wheel lock.

Skid control devices of the type described above are required to perform braking within a minimum distance while preventing wheel lock. Therefore, it is preferable that the vehicle be braked under a condition in which the coefficient of friction between the wheel and the road surface is at a maximum. It is generally found that the maximum coefficient of friction occurs when the slip ratio of the wheel is in the range of 0.15 to 0.2, slip ratio being defined by the equation $$S = (V - Vw)/V$$

where $V$ is the vehicle speed and $Vw$ is the linear velocity of the circumference of the wheel, both $V$ and $Vw$ being expressed, for example, in meters per second. Consequently, conventional devices are designed to employ the slip ratio constant control method by setting the slip ratio within this range. (In the slip ratio constant control method, the speed of the vehicle is sensed by a radar-type speedometer or by integration of the output of an accelerometer. These parameters are used to maintain the slip ratio at an essentially constant value which is independent of the road surface conditions.) In practice, however, the slip ratio at which the coefficient of friction is at a maximum varies widely with the kind or condition of road surface, the type of tire or other factors. Therefore, the slip ratio constant control method is disadvantageous in that satisfactory skid control operation cannot be ensured.

SUMMARY OF THE INVENTION

It is found that when the pressure of the braking fluid is increased linearly resulting in the wheel slip ratio exceeding the point where the coefficient of friction is a maximum, the deceleration of the wheel velocity is suddenly increased and the wheel velocity is rapidly decreased. An object of this invention is to prevent an increase of the braking distance as a result of the variation in wheel rotation by obtaining the slip ratio, at which the coefficient of friction is at a maximum, from the deceleration of the wheel velocity and by varying the braking pressure applying speed.

In order to attain the above-described object, the skid control device embodying this invention comprises a wheel velocity detector adapted to detect the wheel velocity, a pressure modulator adapted to change the pressure of braking fluid in the wheel cylinder during braking, and a controller which controls the wheel in accordance with the wheel velocity at the slip ratio at which the coefficient of friction is at a maximum. When the deceleration of the wheel velocity suddenly attains a large value during braking, the wheel velocity setting means of the controller detects that the wheel slip ratio has exceeded the slip ratio at which the coefficient of friction is at a maximum and generates a pressure reducing signal as well as derives the deceleration curve having a set gradient. Moreover, the wheel velocity setting means produces a pressure applying signal during the period from the time when the wheel velocity exceeds the deceleration curve until the time when the wheel velocity reaches a maximum. When the wheel velocity increases beyond the deceleration curve, the first correcting means of the controller adjusts the set gradient so as to decrease it in accordance with the increase in the wheel velocity. The second correcting means adjusts the set gradient so as to increase it to a specified value during the period from the time when the wheel velocity reaches a maximum until the time when the wheel velocity is again decreased to agree with the deceleration curve. Furthermore, the controller issues a signal for varying the braking pressure applying speed during the period from the time when the pressure reducing signal is generated until the time when the wheel velocity reaches a maximum. The pressure modulator decreases the pressure of the braking fluid during the period from the time when the deceleration of wheel velocity exceeds the set gradient due to the reception of the pressure reducing signal until the time when the wheel velocity exceeds the deceleration curve. Furthermore, during the period from the time when the wheel velocity exceeds the deceleration curve until the time when the deceleration of the wheel velocity exceeds the set gradient again, the pressure regulator increases the pressure of braking fluid at a large acceleration by means of the pressure applying signal and the signal for varying the braking pressure applying speed before the wheel velocity reaches a maximum. From this time on, no signal is issued and the pressure of the braking fluid is increased with a small acceleration.

DESCRIPTION OF A PREFERRED EMBODIMENT

Figure 1:
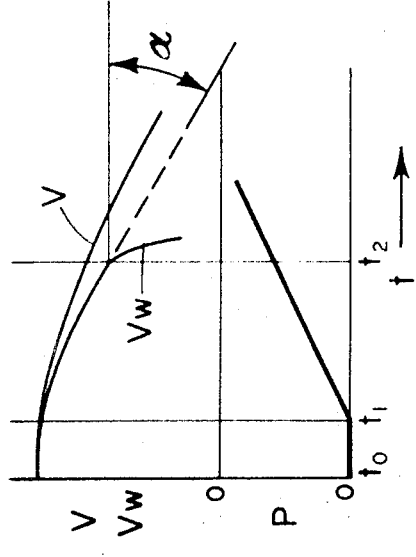
FIG. 1 is a diagram illustrating the relationship between the wheel slip ratio and the coefficient of friction of a wheel.

FIG. 1 illustrates the $\mu$ −S curves in which the ordinate represents the coefficient of friction $\mu$ and the abscissa represents the wheel slip ratio S. It will be apparent from FIG. 1, wherein the curves $a_1$ through $a_4$ represent variations in the condition of the road surface or the vehicle velocity, that the slip ratio at which the coefficient of friction is at a maximum is substantially changed. Consequently, it is evident that the conventional method utilizing the slip ratio constant control is not satisfactory.

Figure 2:
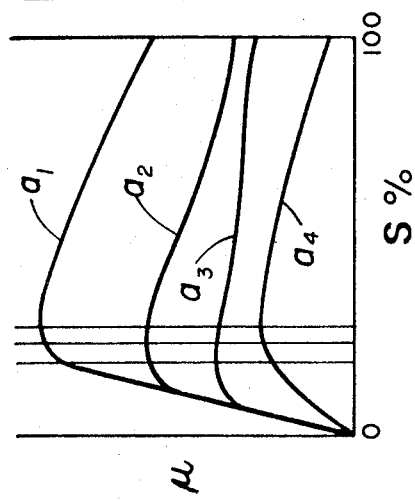
FIG. 2 is a diagram illustrating the changes in wheel velocity at the time when the pressure of braking fluid is increased with a definite rate of increase.

FIG. 2 illustrates the changes in the wheel velocity $Vw$ and the vehicle velocity $V$ with respect to the pressure P of the braking fluid increasing linearly from the time $t_1$, in which the ordinate represents the pressure P of the braking fluid, the wheel velocity $Vw$ and the vehicle velocity $V$ and the abscissa represents the time $t$. It will be apparent from FIG. 2 that the wheel velocity $Vw$ gradually separates from the vehicle velocity $V$ with the increase in the pressure P of the braking fluid, thus increasing the slip ratio, and that the wheel velocity attains the maximum coefficient of friction at the time $t_2$ and then decreases rapidly with the increase in the deceleration. Consequently, deceleration with the maximum coefficient of friction is always ensured when the deceleration of the wheel velocity reaches $\alpha$ in accordance with the condition of the road surface and the vehicle velocity to be encountered at the time of braking. The skid control device embodying this invention is adapted to detect the above-mentioned time $t_2$ and to derive the deceleration curve having the set gradient $\alpha$.

Figure 3:
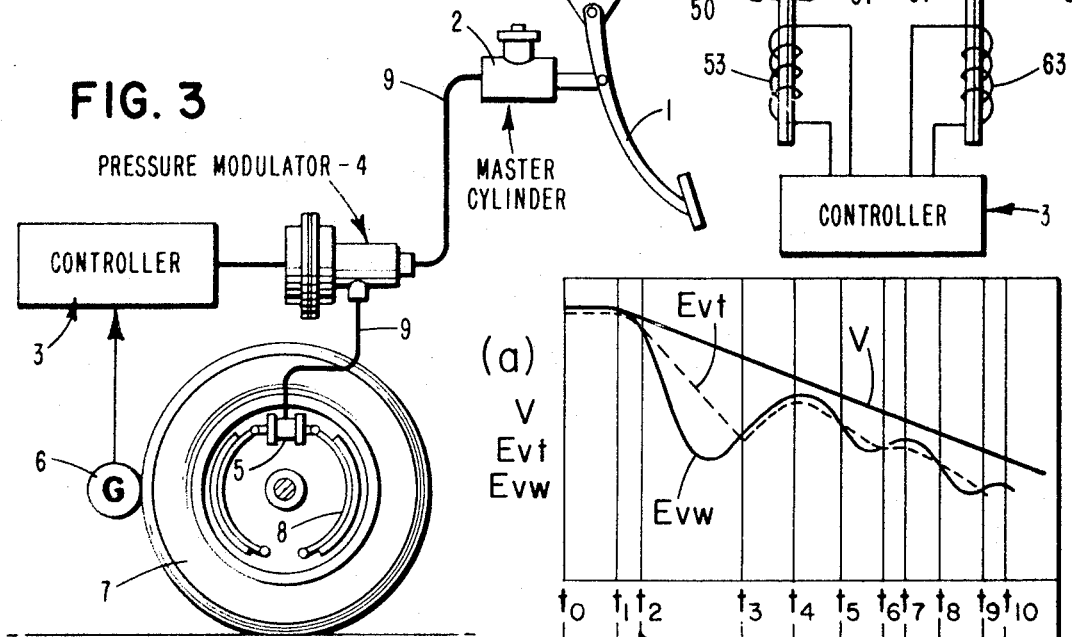
FIG. 3 illustrates schematically the skid control device embodying the invention together with the brake line.

The outline of the skid control device according to this invention will be described with reference to FIG. 3. A pressure modulator 4 is connected in an oil passage 9 leading from a master cylinder 2 of a brake pedal 1 to a wheel cylinder 5 adapted to actuate a brake shoe 8 of a wheel 7. A wheel velocity detector 6 adapted to detect the wheel velocity is located in the vicinity of wheel 7. A controller 3 is interposed between pressure modulator 4 and wheel velocity detector 6 by way of an electrical connection. Skid control does not take place during normal braking, the fluid derived from the master cylinder 2 in accordance with the effort applied to the brake pedal 1 being supplied without modification to the wheel cylinder 5, thereby applying appropriate braking force thereto. On the other hand, if wheel 7 is likely to become locked when emergency braking is applied, the pressure modulator 4 is actuated through the controller 3 by means of the wheel velocity signal derived from the wheel velocity detector 6 and the braking fluid from the master cylinder 2 is shut off. Thus, the pressure of the wheel cylinder 5 is regulated so that the vehicle can be braked in the minimum distance without causing wheel lock.

Figure 4:
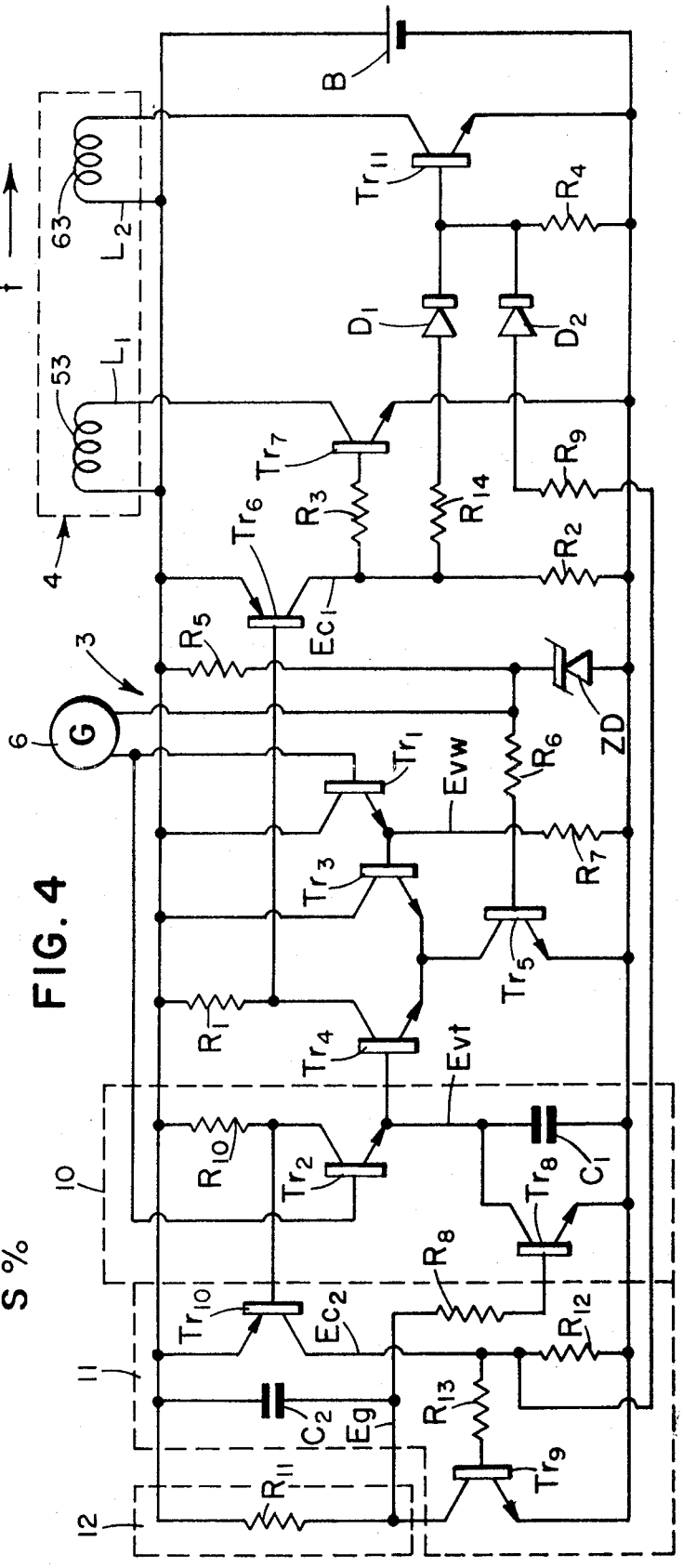
FIG. 4 is a skid control circuit diagram of the device according to this invention.

The electrical circuit of the skid control device embodying this invention will be described with reference to FIG. 4. One of the inputs of the wheel velocity detector 6 is connected to the bases of transistors $Tr_1$ and $Tr_2$ of the controller 3. The emitter of the transistor $Tr_1$ is connected to a resistor $R_7$. Thus, the voltage $Evw$ proportional to the wheel velocity $Vw$ is generated. The collector of the transistor $Tr_2$ is connected to a resistor $R_{10}$ and the emitter thereof is connected to a capacitor $C_1$ of a wheel velocity setting means 10 in order to charge or discharge capacitor $C_1$. Thus, a deceleration voltage $Evt$ representing the deceleration curve is generated. The emitters of transistors $Tr_1$ and $Tr_2$ are connected to the bases of transistors $Tr_3$ and $Tr_4$ thereby causing the one of these transistors having the higher base voltage to conduct. The collector of the transistor $Tr_4$ is connected to a resistor $R_1$ and the base of a transistor $Tr_6$, thus producing a voltage drop across the resistor $R_1$ when the voltage $Evt$ is higher than the voltage $Evw$. The collector of the transistor $Tr_6$ is connected to a resistor $R_2$ and is also connected through a resistor $R_3$ to the base of a transistor $Tr_7$. Thus, the transistor $Tr_6$ is caused to conduct by the voltage drop across resistor $R_1$, thereby generating the voltage $Ec_1$. The collector of transistor $Tr_7$ is connected to an electromagnetic coil 53 of pressure modulator 4 and is caused to conduct by the voltage $Ec_1$ to pass a current to the electromagnetic coil 53, thus applying the signal $L_1$. The emitters of the transistors $Tr_3$ and $Tr_4$ of the differential amplifying circuit are connected to the collector of a transistor $Tr_5$. A resistor $R_6$ of a constant voltage circuit, another input of the wheel velocity detector 6 is connected to the base of transistor $Tr_5$ and a resistor $R_5$ and a Zener diode ZD are connected to the other end of resistor $R_6$. Current is supplied from a batery power source B.

The capacitor $C_1$ is connected in parallel with a transistor $Tr_8$ to constitute a discharge circuit and the base of the transistor $Tr_8$ is connected through a resistor $R_8$ to a capacitor $C_2$ and the collector of a charging transistor $Tr_9$ of a first correcting means 11, thus generating the voltage $Eg$. The base of the transistor $Tr_9$ is connected through resistors $R_{13}$ and $R_{12}$ and a transistor $Tr_{10}$ to the collector of transistor $Tr_2$, thus generating the voltage $Ec_2$ at the transistor $Tr_{10}$ when a voltage drop is developed across the resistor $R_{10}$ and also causing transistor $Tr_9$ to conduct and charge capacitor $C_2$. Thus, the voltage $Eg$ is adjusted so that it is decreased in proportion to the charging time of the capacitor $C_2$.

Capacitor $C_2$ is connected to a resistor $R_{11}$ of a second correcting means 12 to constitute a discharge circuit. Thus, the voltage $Eg$ is adjusted so as to increase by discharging the capacitor $C_2$ when the transistor $Tr_9$ is not conducting.

The collector of the transistor $Tr_6$ is connected through a resistor $R_{14}$ and a diode $D_1$ to the base of a transistor $Tr_{11}$. The base of transistor $Tr_{11}$ is connected through a resistor $R_9$ and a diode $D_2$ to the collector of the transistor $Tr_{10}$ and is also connected to ground through a bias resistor $R_4$. Thus, transistor $Tr_{11}$ is caused to conduct when the voltages $Ec_1$ and $Ec_2$ are being generated. The transistor $Tr_{11}$ is connected to another electromagnetic coil 63 of pressure modulator 4 to apply the signal $L_2$ thereto by passing a current through the coil.

Figure 5:
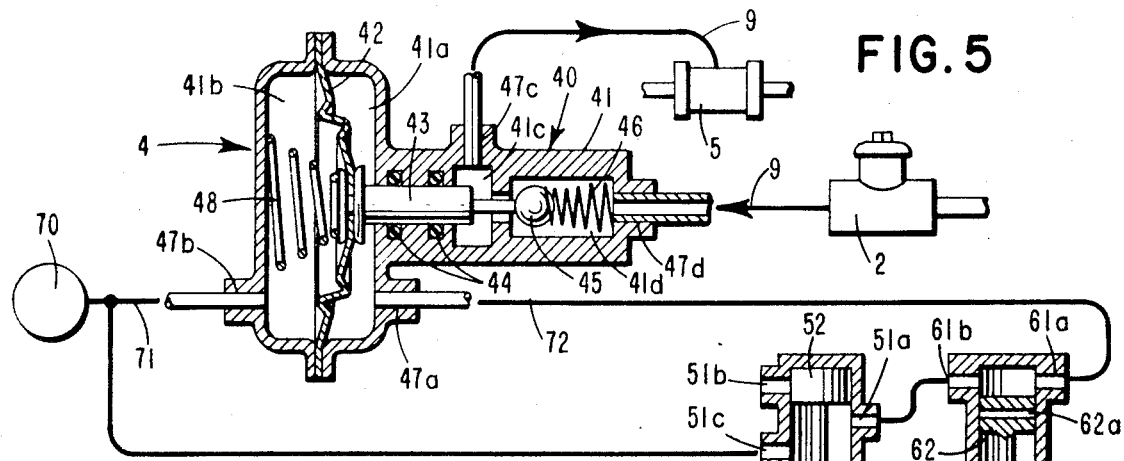
FIG. 5 is a schematic cross-sectional view of a hydraulic pressure modulator.

Next, the pressure modulator 4 will be described with reference to FIG. 5. The pressure modulator 4 consists of a pressure modulating means 40, a change-over valve 50 and a throttle valve 60. The pressure modulating means 40 comprises a cylinder 41, a diaphragm 42 dividing the large diameter portion of cylinder 41, a piston 43 connected to diaphragm 42, a seal 44, a control valve consisting of a check ball 45 adapted to open or close the oil passage 9 between the master cylinder 2 and the wheel cylinder 5, a spring 48 acting on the diaphragm 42, and a spring 46 acting on the check ball 45. The cylinder 41 comprises an operating chamber 41a, a negative pressure chamber 41b, a modulating chamber 41c and an introducing chamber 41d. The change-over valve 50 comprises a cylinder 51, a valve body 52 and the electromagnetic coil 53. The change-over valve 60 comprises a cylinder 61, a valve body 63 having a passage 62a and the electromagnetic coil 63. When the electromagnetic coil 53 is excited by the current from the controller 3, the valve body 52 moves downward to bring a connecting hole 51a into communication with a connecting hole 51b, thus introducing the atmosphere. On the other hand, when the electromagnetic coil 53 is de-energized, the valve body 52 moves upward to establish communication between the connecting hole 51a and a connecting hole 51c, thus removing the air by means of a negative pressure source 70. When the electromagnetic coil 63 is excited by the current from the controller 3, the valve body 62 moves downward to establish direct communication between connecting holes 61a and 61b. When electromagnetic coil 63 is de-energized, the valve body 62 moves upward to perform throttling by means of the passage 62a. The pressure modulating means 40 always establishes communication between the negative pressure chamber 41b and the negative pressure source 70 through an oil passage 71 and introduces the atmosphere or the negative pressure admitted by the change-over valve 50 into the operating chamber 41a through an oil passage 72. At the same time, its flow is regulated by means of the throttle valve 60. The braking fluid from the master cylinder 2 is directed to the wheel cylinder 5 through a connecting hole 47d, the introducing chamber 41d, the modulating chamber 41c and a connecting hole 47c.

Figure 6:
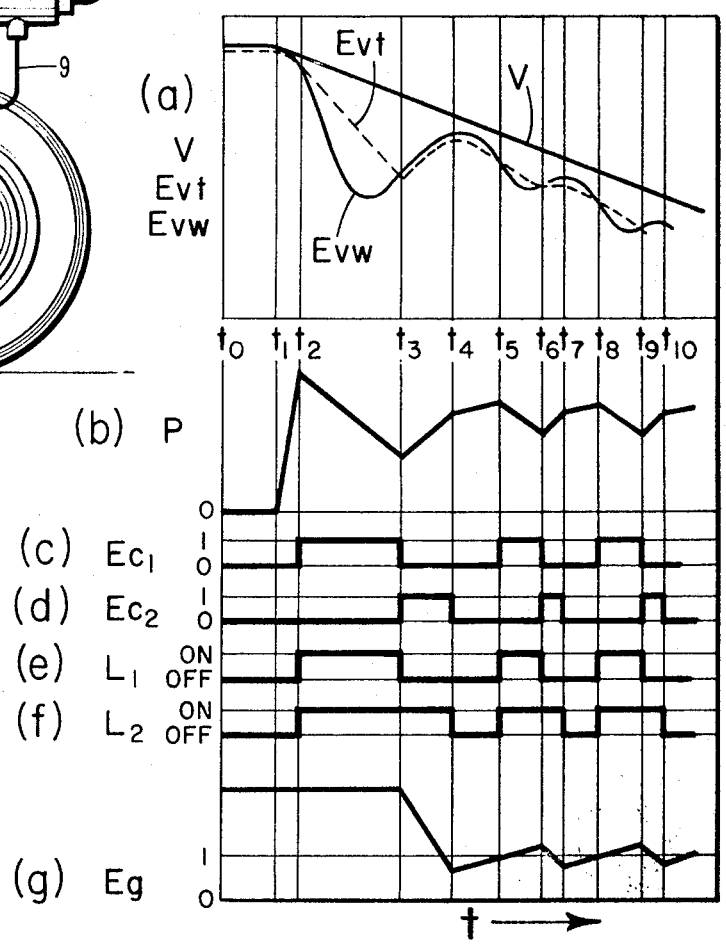
FIG. 6 is a diagram for explaining the operation of the device according to this invention.

The operation of the skid control device of the above-described construction will be described with reference to FIG. 6. FIG. 6(a) illustrates the relationship between the voltage Evw which is related to the wheel velocity Vw, the voltage Evt which is related to the deceleration curve, the imaginary vehicle velocity V and the time t. FIG. 6(b) illustrates the relationship between the pressure P of the braking fluid to be supplied to the wheel cylinder 5 and the time t. FIGS. 6(c) through (g) show the relationship between the voltages $Ec_1$, $Ec_2$ and $Eg$, signals $L_1$ and $L_2$ and the time t.

When a vehicle is under normal travelling condition during the time from $t_0$ to $t_1$, the wheel velocity Vw is equal to the vehicle velocity V and capacitor $C_1$ of the controller 3 is charged until its voltage Evt becomes equal to the voltage Evw. Therefore, transistor $Tr_2$ as well as transistors $Tr_6$ and $Tr_7$ are driven into non-conduction, and the electromagnetic coil 53 of the pressure modulator 4 is de-energized. Transistors $Tr_{10}$ and $Tr_{11}$ are also driven into non-conduction and the electromagnetic coil 63 is de-energized. Furthermore, transistor $Tr_9$ is also driven into non-conduction and resistor $R_{11}$ shunts capacitor $C_2$ to maintain the voltage $Eg$ at a maximum. Transistor $Tr_8$ is caused to conduct by voltage $Eg$ and capacitor $C_1$ is discharged. However, conduction of transistor $Tr_2$ is caused by the decrease in the voltage Evt, thus charging capacitor $C_1$ with the battery power source B. Finally, the voltage Evt is maintained equal to the voltage Evw. At this time, the operating chamber 41a and the negative pressure chamber 41b of the pressure modulating means 40 are brought into communication with the negative pressure source 70 by means of the change-over valve 50. Thus, the diaphragm 42 and the piston 43 are moved to the right by the action of the spring 48, and consequently the check ball 45 is depressed to bring the master cylinder 2 into communication with the wheel cylinder 5.

When emergency braking is applied to a vehicle by means of the brake pedal 1 at the time $t_1$, the pressure P of the braking fluid is increased to decelerate the wheel velocity Vw. As this deceleration is smaller than the voltage drop rate of capacitor $C_1$ due to discharge through transistor $Tr_8$ during the initial period, the voltage Evt remains equal to the voltage Evw and they are simultaneously decreased. There is a very small voltage drop across resistor $R_{10}$ until the time $t_2$, and the voltages $Ec_1$, $Ec_2$, $Eg$ and the signals $L_1$ and $L_2$ are in the same state as they were during the period from $t_0$ to $t_1$.

When the coefficient of friction between the wheel and road surfaces attains a maximum at the time $t_2$ and the wheel velocity Vw is suddenly decreased, the rate of decrease of the voltage Evw becomes larger than the rate of decrease of the voltage Evt due to discharge of capacitor $C_1$ through transistor $Tr_8$. Thus, the voltage Evw becomes lower than the voltage Evt and transistor $Tr_2$ is driven into complete non-conduction. On the other hand, transistors $Tr_4$ and $Tr_6$ conduct due to the difference between voltages Evt and Evw thereby making the voltage $Ec_1$ correspond to the voltage of the signal "1". Voltage $Ec_1$ serves as the conducting signal of transistor $Tr_7$ through resistor $R_3$, thus applying the pressure reducing signal $L_1$ to the electromagnetic coil 53 of the change-over valve 50 of pressure modulator 4. Voltage $Ec_1$ also causes transistor $Tr_{11}$ to conduct through resistor $R_{14}$ and diode $D_1$, thus applying signal $L_2$ to electromagnetic coil 63 of throttle valve 60. Consequently, in the pressure modulator 4, change-over valve 50 and throttle valve 60 admit the atmosphere into the operating chamber 41a of the pressure modulating means 40. Diaphragm 42 and piston 43 are moved to the left due to the difference between the pressure in the operating chamber 41a and that in the negative pressure chamber 41b. Thus, the depression of check ball 45 is released and the flow of braking fluid to cylinder 5 is shut off. Simultaneously, the volume of the modulating chamber 41c is increased due to the movement of the piston 43 to the left, thus decreasing gradually the pressure of the braking fluid of wheel cylinder 5. The pressure P of braking fluid continues to decrease until the time $t_3$, thus preventing the occurrence of skidding. Voltage Evt of controller 3 decreases along the deceleration curve of the set gradient determined by the discharge of capacitor $C_1$ and the wheel velocity Vw is increased again to approach the vehicle velocity. The voltage Evw is also increased.

When the wheel velocity being increased exceeds the deceleration curve at the time $t_3$, the voltage Evw becomes higher than the voltage Evt. Transistor $Tr_4$ is driven into non-conduction and the voltage $Ec_1$ becomes the signal "0". Thus, the pressure reducing signal $L_1$ to the pressure modulator 4 is eliminated. On the other hand, transistor $Tr_2$ is conducting and capacitor $C_1$ is charged. At the same time, there is a voltage drop across resistor $R_{10}$. Transistor $Tr_{10}$ conducts to convert the voltage $Ec_2$ to the voltage of the signal 1. Voltage $Ec_2$ is applied to transistor $Tr_{11}$ through resistor $R_9$ and diode $D_2$ to cause the transistor to conduct, thus continuing to apply the signal $L_2$ to the electromagnetic coil 63 of throttle valve 60 even after the voltage $Ec_1$ is converted to the signal 0. Voltage $Ec_2$ also causes transistor $Tr_9$ to conduct through the resistor $R_{13}$ and charges capacitor $C_2$ to decrease the voltage $Eg$. Consequently, in the pressure modulator 4, change-over valve 50 connects the operating chamber 41a of the pressure modulating means 40 to the negative pressure source 70. The throttle valve 60 increases the opening of the passage by means of the signal $L_2$. The piston 43 is moved to the right at high speed due to the difference of pressures. The volume of the modulating chamber 41c is decreased and braking is performed with a high speed pressure change. Such rapid increase in the pressure P of braking fluid is continued until the time $t_4$. At this time, the flow of braking fluid from the master cylinder 2 to the wheel cylinder 5 is interrupted by means of check ball 45. The voltage $Eg$ decreases in accordance with the increase in the wheel velocity Vw. The voltage Evt increases so as to decrease the set gradient of the deceleration curve in accordance with the decrease in the voltage $Eg$.

If the wheel velocity $Vw$ decreases again due to the increase in the pressure P of braking fluid after reaching a maximum at the time $t_4$, the voltage $Evw$ becomes lower than the voltage $Evt$ to drive the transistor $Tr_2$ into non-conduction. Therefore, the voltage $Ec_2$ becomes the signal 0 and the transistor $Tr_{11}$ is also driven into non-conduction. Thus, the signal $L_2$ of the throttle valve 60 of the pressure modulator 4 is eliminated. In this way pressure modulator 4 de-energizes the electromagnetic coils 53 and 63 of change-over valve 50 and throttle valve 60, respectively. The throttle valve 60 performs throttling, discharges the air from the operating chamber 41a of the pressure modulating means 40 slowly and decreases the increase rate of the pressure P of braking fluid due to the decrease in the volume of the modulating chamber 41c by piston 43. At the same time, transistor $Tr_9$ is driven into non-conduction and capacitor $C_2$ is discharged again by resistor $R_{11}$, thus increasing the voltage $Eg$. Consequently, the discharge of capacitor $C_1$ by transistor $Tr_8$ is accelerated, and the voltage $Evt$ is decreased so that the set gradient of the deceleration curve is increased to a specified value at a constant rate.

When the coefficient of friction again becomes maximum at the time $t_5$, the voltage $Evw$ of the wheel velocity $Vw$ becomes lower than the voltage $Evt$ in the same manner as it did at the time $t_2$, thus causing transistor $Tr_4$ to conduct. The voltage $Ec_1$ becomes the voltage of the signal 1 and the pressure reducing signal $L_1$ is applied to the electromagnetic coil 53 of pressure modulator 4. At the same time, the signal $L_2$ is applied to the electromagnetic coil 63 of throttle valve 60, thus restoring the wheel velocity $Vw$ by decreasing rapidly the pressure P of the braking fluid. In a manner similar to that described above, the rapid pressure applying signal is applied to the pressure modulator 4 at the times $t_6$ and $t_9$ and the slow pressure applying signal is applied at the times $t_7$ and $t_{10}$. Furthermore, the pressure reducing signal is applied to the pressure modulator 4 at the time $t_8$. The first correction of the decrease in the set gradient of the deceleration curve to be caused due to the decrease in the voltage $Eg$ is performed at the periods from $t_6$ to $t_7$ and from $t_9$ to $t_{10}$. Also, the second correction of the increase in the set gradient of the deceleration curve to be caused due to the increase in the voltage $Eg$ is performed at the period from $t_7$ to $t_8$. The mean value $Eg_1$ of the voltage $Eg$ corresponding to the condition of the road surface is obtained by the continuous correcting process such as the above-mentioned first and second corrections. Consequently, braking is always performed at the slip ratio at which the coefficient of friction is nearly at a maximum on the average.

As described above, the skid control device embodying this invention regulates the pressure of braking fluid so that braking is performed at the slip ratio at which the coefficient of friction is at a maximum on the average, thus stopping a vehicle in the minimum distance in accordance with the condition of a road surface without causing wheel lock. During the process wherein the wheel velocity restored at the time of wheel lock exceeds the deceleration curve and is again increased until wheel lock again occurs, the pressure of the braking fluid is rapidly increased at a high acceleration until the wheel velocity reaches a maximum. Then, however, this pressure is adjusted so that its increase becomes slow with a low acceleration. Consequently, it becomes possible to reduce the variation in wheel rotation to be caused due to excessive acceleration in the case where a wheel having a small moment of inertia, such as a front wheel, is to be controlled. Moreover, it is also possible to prevent an increase in the braking distance due to variation in the pressure of the braking fluid. Therefore, the skid control device embodying this invention is quite advantageous for controlling all wheels.

Instead of the electrical circuit described above, the skid control device embodying this invention may comprise mechanical, oil hydraulic or air pressure elements. For example, in employing mechanical elements, the capacitor $C_1$ may be replaced by a flywheel, the discharging transistor $Tr_8$ by a friction brake adapted to decelerate said flywheel, the charging transistor $Tr_2$ by a one-way clutch adapted to accelerate said flywheel, the differential amplifier by a governor mechanism, and so on.

What is claimed is:

1. A skid control device for a vehicle having at least one wheel provided with braking means actuated by braking fluid comprising
   a. a detector coupled to said wheel for generating a wheel velocity voltage corresponding to the velocity of said wheel,
   b. controller means having first and second outputs comprising
      1. wheel velocity setting means coupled to said detector for receiving said wheel velocity voltage and generating a deceleration voltage which decreases in accordance with a set gradient, said wheel velocity setting means further generating a pressure applying signal during the period from the time when said wheel velocity voltage exceeds said deceleration voltage until the time when said wheel velocity voltage reaches a maximum,
      2. a first correcting means coupled to said wheel velocity setting means for receiving said pressure applying signal, said first correcting means decreasing said set gradient by an amount corresponding to the increase in wheel velocity voltage during the time when said wheel velocity voltage is increasing and has a magnitude greater than that of said deceleration voltage,
      3. a second correcting means coupled to said first correcting means for increasing said set gradient to a predetermined value during the period from the time when said wheel velocity voltage reaches a maximum until a time when the magnitude of said wheel velocity voltage corresponds to the magnitude of said deceleration voltage,
      4. means coupling said deceleration voltage to the first and second outputs of said controller when the magnitude of said wheel velocity voltage is lower than the magnitude of said deceleration voltage, and
      5. means coupling said pressure applying signal to the second output of said controller, and
   c. a pressure modulator having an input coupled to the first and second outputs of said controller for regulating the flow of braking fluid to said braking means, said pressure modulator sequentially (i) decreasing the pressure of said braking fluid in response to signals at the first and second outputs of said controller during the period from the time when the magnitude of said wheel velocity voltage becomes lower than the magnitude of said deceleration voltage until the time when the wheel velocity voltage becomes equal to said deceleration voltage, (ii) increasing the pressure of said braking fluid in response to a signal at said second output only during the period when the magnitude of said wheel velocity voltage is increasing and exceeds that of said deceleration voltage, and (iii) decreasing the pressure applying speed of said braking fluid in the absence of signals at the first and second outputs of said controller during the period from the time when said wheel velocity voltage begins decreasing until the time when its magnitude becomes less than that of said deceleration voltage.

2. A skid control device as defined by claim 1, wherein said wheel velocity setting means comprises first and second transistors, a first capacitor and a first resistor, the collector - emitter circuit of said first transistor being connected in series with said first resistor and said first capacitor across a voltage source, the base of said first transistor being connected to said detector, and the collector - emitter circuit of said second transistor being coupled across said first capacitor.

3. A skid control device as defined by claim 2, wherein said first correcting means comprises third and fourth transistors, a second capacitor and a second resistor, the collector - emitter circuit of said third transistor being connected in series with said second resistor across said voltage source, said second capacitor being connected between one terminal of said voltage source and the base of said second transistor and the collector - emitter circuit of said fourth transistor being connected between the base of said second transistor and the other terminal of said voltage source, the base of said fourth transistor being connected to the junction between said second resistor and said third transistor.

4. A skid control device as defined by claim 3, wherein said second correcting means comprises a third resistor coupled across said second capacitor.

5. A skid control device as defined by claim 1, wherein said pressure modulator comprises pressure modulating means and a control valve for regulating the amount of braking fluid actuating said braking means; a change-over valve having a first electromagnetic coil actuated by a signal at the first output of said controller for controlling the relative pressures in the first and second cylinder portions of said pressure modulating means, and change-over valve equalizing the pressure in said cylinder portions when said electromagnetic valve is de-energized in the absence of a signal at said first output to open said control valve and changing the pressure in one of said cylinder portions when said electromagnetic valve is energized by the signal at said first output to close said control valve; and a throttle valve having a second electromagnetic coil actuated by the signal at said second output of said controller interposed between said change-over valve and said first cylinder portion, said throttle valve throttling the fluid flow between said change-over valve and said first cylinder portion in the absence of a signal at said second output and permitting unrestricted flow when said second electromagnetic coil is energized by a signal at said second output.

6. The method of controlling skidding in a vehicle during slowing thereof having at least one wheel provided with braking means actuated by braking fluid comprising
  a. detecting the speed of said wheel,
  b. generating a deceleration curve having a set gradient,
  c. comparing the deceleration of said wheel during slowing of said vehicle with said deceleration curve,
  d. decreasing the pressure of said braking fluid when the deceleration of said wheel becomes greater than said set gradient until the wheel velocity exceeds the magnitude of said deceleration curve,
  e. increasing the pressure of said braking fluid when the wheel velocity is increasing and exceeds the magnitude of said deceleration curve,
  f. decreasing said set gradient by an amount corresponding to the increase in wheel velocity when the wheel velocity is increasing and exceeds the magnitude of said deceleration curve,
  g. decreasing the pressure applying speed of said braking fluid during the period from the time when said wheel velocity begins decreasing until the time when its magnitude becomes less than that of said deceleration curve, and
  h. increasing said set gradient to a predetermined value during the period from the time when the wheel velocity reaches a maximum to a time when it equals said deceleration curve.

* * * * *